(12) United States Patent
Berry et al.

(10) Patent No.: US 6,332,117 B1
(45) Date of Patent: Dec. 18, 2001

(54) GENERAL EVENT STAMPING SCHEME

(75) Inventors: Robert Francis Berry; Riaz Y. Hussain, both of Austin; Chester Charles John, Jr., Round Rock; Frank Eliot Levine; Robert John Urquhart, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/177,035

(22) Filed: Oct. 22, 1998

(51) Int. Cl.[7] ............................. G06F 15/00; G06F 17/40
(52) U.S. Cl. ............................. 702/187; 702/182
(58) Field of Search .................. 702/81, 119, 122, 702/123, 176, 177–180, 182–188, FOR 135, 139; 714/25, 33, 39, 45, 47; 717/6

(56) References Cited

U.S. PATENT DOCUMENTS

| | | | |
|---|---|---|---|
| 3,583,392 | * 6/1971 | Frieberger et al. | 600/500 |
| 5,355,487 | * 10/1994 | Keller et al. | 717/4 |
| 5,450,349 | * 9/1995 | Brown, III et al. | 714/27 |
| 5,463,775 | 10/1995 | DeWitt et al. | 395/184.01 |
| 5,564,285 | 10/1996 | Jurewicz et al. | 62/127 |
| 5,572,672 | 11/1996 | DeWitt et al. | 395/184.01 |
| 5,642,478 | 6/1997 | Chen et al. | 395/183.21 |
| 5,675,511 | 10/1997 | Prasad et al. | 364/514 A |
| 5,680,864 | 10/1997 | Morgan et al. | 128/696 |
| 5,682,328 | 10/1997 | Roeber et al. | 364/550 |
| 5,691,917 | 11/1997 | Harrison | 364/514 B |
| 5,717,879 | 2/1998 | Moran et al. | 395/339 |
| 5,748,499 | 5/1998 | Trueblood | 364/551.01 |
| 5,768,119 | 6/1998 | Havekost et al. | 364/133 |
| 5,768,500 | 6/1998 | Agrawal et al. | 395/184.01 |
| 5,774,660 | 6/1998 | Brendel et al. | 395/200.31 |
| 5,938,764 | * 8/1999 | Klein | 713/1 |
| 6,044,335 | * 3/2000 | Ksendzov | 702/182 |
| 6,094,729 | * 7/2000 | Mann | 714/25 |

OTHER PUBLICATIONS

Rosenberg, Jerry M. Ph. D. Dictionary of Computers, Information Processing, and Telecommunications, Second Edition. 1987, p. 652.*

Dictionary of Computing, Fourth Edition. 1996. p. 505.*

"Method for Event Monitoring and Analysis for Check Image Work Flow", *IBM Technical Disclousure Bulletin*, vol. 38, No. 10, Oct. 1995, pp. 453–455.

"Tracing of Large Amounts of Data by Using Main Memory as a Trace Buffer", *IBM Technical Disclosure Bulletin*, vol. 40 No. 06, Jun. 1997, pp. 47–50.

"Process for Real–Time, Trace–Driven Performance Monitors", *IBM Technical Disclosure Bulletin*, vol. 34 No. 5, Oct. 1991, pp. 415–417.

Robert J. Hall et al., "Call Path Profiling of Monotonic Program Resources in UNIX", 1993 Summer USENIX—Jun. 21–25, 1993, Cincinnati, OH, pp. 3–6.

Glen Ammons et al., "Exploiting Hardware Performance Counters with Flow and Context Sensitive Profiling", PLDI 1997, Las Vegas, NV, pp. 85–95.

Thomas Ball et al. "Optimally Profiling and Tracing Programs", ACM Transactions and Programming Languages and Systems, vol. 16, No. 4, Jul. 1994, pp. 1319–1360.

\* cited by examiner

Primary Examiner—Marc S. Hoff
Assistant Examiner—Manuel L. Barbee
(74) Attorney, Agent, or Firm—Kelly K. Kordzik; Winstead Sechrest & Minick P.C.; Jeffrey S. LaBaw

(57) ABSTRACT

During the recording of events occurring within the operation of a data processing system, a user-selected metric of interest is recorded along with the trace data for each recorded event. The metric of interest is a monotonically increasing variable that provides a non-time relationship between the recorded events. This relationship may be time or non-time based.

24 Claims, 3 Drawing Sheets

GENERAL EVENT STAMPING SCHEME

TECHNICAL FIELD

The present invention relates in general to data processing systems, and in particular, the recording of events occurring during an operation of the data processing system.

BACKGROUND INFORMATION

Event recording (tracing) schemes are generally available in many commercially available operating systems. Tracing is quite useful for analysis of the performance of a program, such as an operating system, and for debugging the program. Essentially, tracing is the recording of specified events occurring within a program, which typically consists of pieces of information identifying "what" and "when" whenever an event occurs. Upon the occurrence of a specified event, a call is made to record the traced event within a trace buffer that has been set up, or initialized, to serially record the information in an efficient manner. Since it is desired to record as many events as possible, there is a need to be efficient with the amount of information recorded; otherwise, the trace buffer can fill quite quickly.

FIG. 3 illustrates an example of a typical entry within a trace buffer. The information recorded will include the type 301 of event for which an entry was recorded, a timestamp 302 indicating when the event occurred relative to other events, and some specified data 303 that relates to the event.

The events are collected over a period of time into the trace buffer and then submitted to a postprocessor for analysis. There are many types of analysis possible, but the most typical relates to the amount of time traversed from one type of an event to another (by using the timestamp field to measure elapsed time).

However, such analyses have limits as to what can be observed and evaluated from the trace data. Therefore, there is a need in the art to analyze the performance of a program from a perspective that is user selectable to provide for more variety in how a program's behavior can be studied.

SUMMARY OF THE INVENTION

The present invention addresses the foregoing issues by generalizing the concept of an event's timestamp to be any user-selectable metric of interest ("MOI"). This may include time, bytes allocated by a memory manager, bytes freed by a memory manager, instructions executed, floating point instructions executed, cache misses, misaligned data references, page faults, etc. Essentially, anything that can be monitored and counted within a data processing system may be the MOI.

The present invention then allows the user to easily modify the trace recording mode for any desired MOI.

In an embodiment of the present invention, when a specified event is detected, the event information will be recorded within an entry in the trace buffer, including the MOI. The MOI is specified by a previous mode indicator set by the user or programmer.

The metric of interest may be time or non-time based, and may be monotonically increasing.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
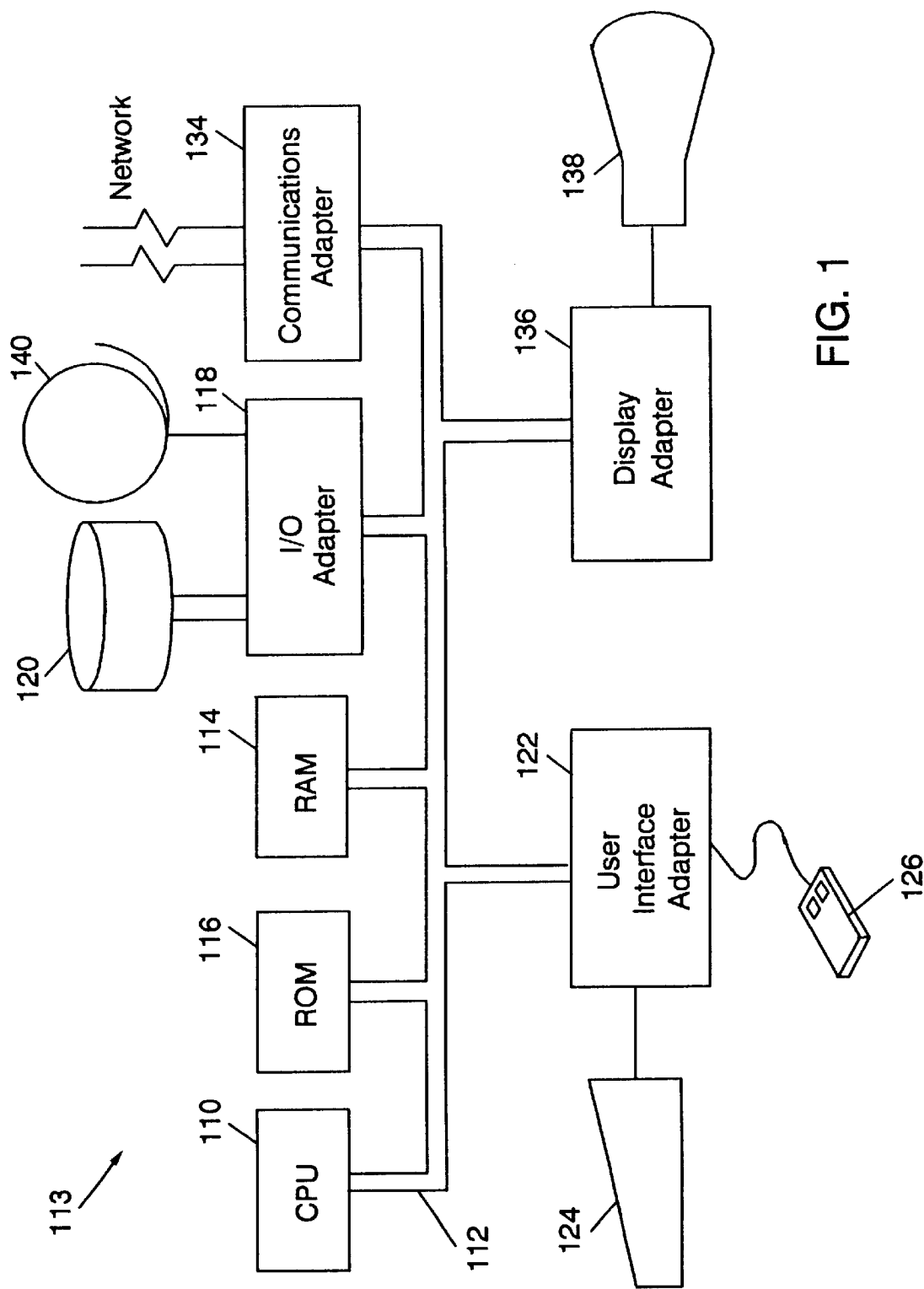
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 113 which may be used for the invention. The system 113 has a central processing unit (CPU) 110 coupled to various other components by system bus 112. Read only memory ("ROM") 116 is coupled to the system bus 112 and includes a basic input/output system ("BIOS") that controls certain basic functions of the data processing system 113. Random access memory ("RAM") 114, I/O adapter 118, and communications adapter 134 arc also coupled to the system bus 112. I/O adapter 118 may be a small computer system interface ("SCSI") adapter that communicates with a disk storage device 120 or a tape drive 140. Communications adapter 134 interconnects bus 112 with an outside network enabling the data processing system 113 to communication with other such systems. Input/Output devices are also connected to system bus 112 via user interface adapter 122 and display adapter 136. Keyboard 124 and mouse 126 are interconnected to bus 112 via user interface adapter 122. Display monitor 138 is connected to system bus 112 by display adapter 136. In this manner, a user is capable of inputting to the system throughout the keyboard 124 or mouse 126 and receiving output from the system via display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
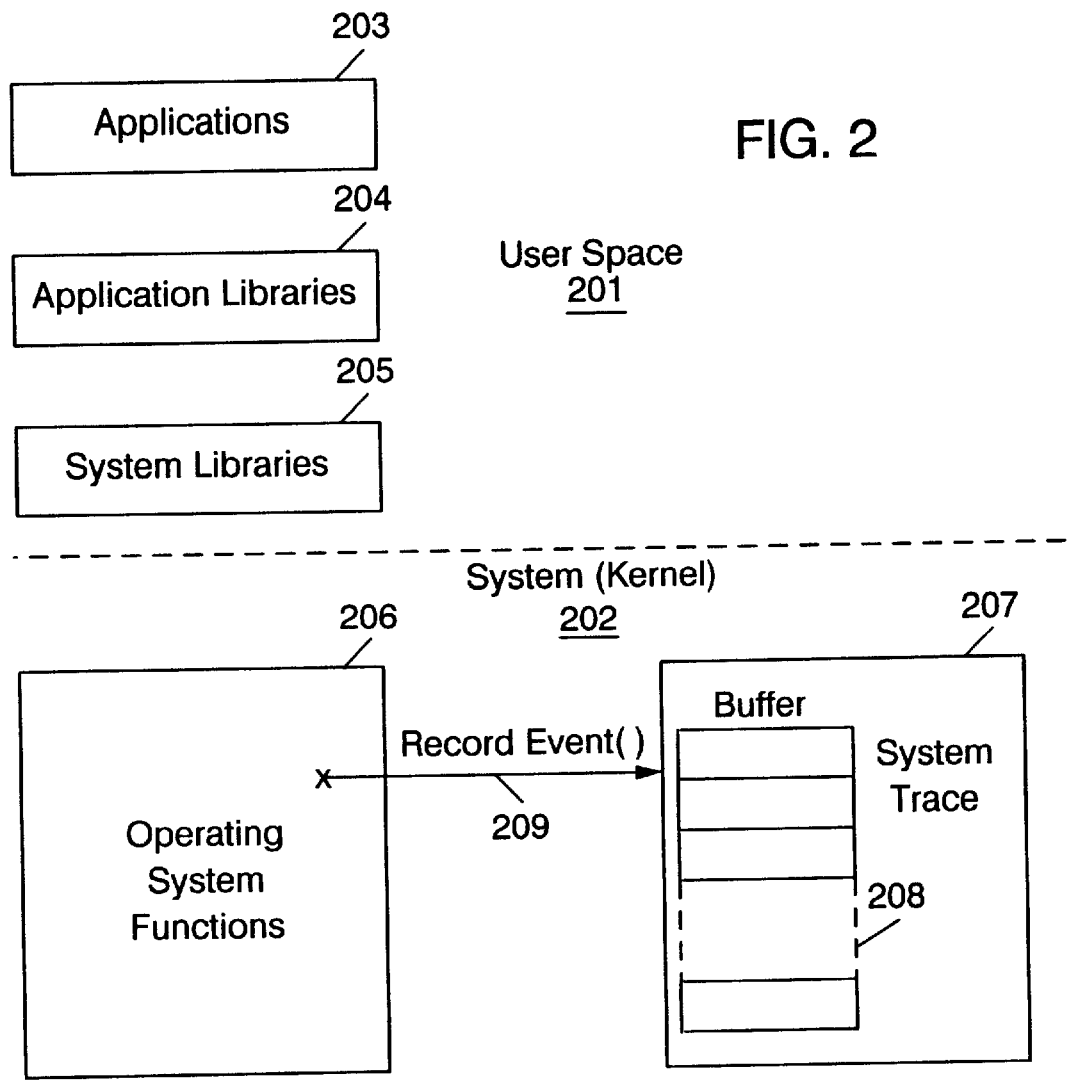
FIG. 2 illustrates an embodiment of the present invention where a system trace program is initialized within a data processing system.

Referring next to FIG. 2, there is illustrated an example of an implementation of a tracing program within a data processing system, such as data processing system 113. A data processing system 113 typically includes an operating system within the kernel 202 having a plurality of operating system functions 206 for managing the resources of the data processing system 113. Divided from the kernel 202 is the user space 201, which may typically include applications 203, application libraries 204, system libraries 205, etc.

A system trace 207 is a program that can be implemented within the kernel 202 or somewhere in the user space 201. Implementation within the kernel 202 helps in alleviating contentions for simultaneously recording of multiple events.

In the set-up of the system trace program 207, a portion of memory is allocated for the trace buffer 208, which includes a plurality of entries for serially storing the recorded events. As an event is recorded within a buffer entry, a pointer is moved to the next entry within the buffer 208 for the next recorded event. Note, however, that event recording in accordance with the present invention need not be serial into a buffer with an advancing buffer pointer. It could, instead, be accumulated into a dynamically built structure.

As discussed above, the events to be recorded are specified by the user within the system trace program 207. Such events may occur anywhere within the data processing system. For example, various events may be monitored within the operating system 206, such as dispatch events, scheduling events, and threading events, or somewhere within the user space, such as events occurring within the application programs 203, the application libraries 204, or the system libraries 205. However, please note that events to be recorded should not be limited to those discussed herein and shown with respect to FIG. 2. Any other event occurring during the operation of one or more programs within the data processing system 113 may be monitored and recorded.

As each event occurs, a call (Record Event ( )) 209 is performed to record the information associated with the event within an entry in the buffer 208. As is known in the prior art, when such a call is performed, the trace program retrieves the timestamp information from a specified and well-known counter for inclusion within the information stored in the buffer entry for the recorded event. The resultant trace data will include a plurality of serially recorded entries, each including the timestamp information providing an ability to determine when each event occurs with respect to other events. For example, when a particular call or method is entered can be recorded in addition to when the exit from the method occurs, which provides the amount of time during which that method was performing.

The amount of memory allocated for the trace buffer 208 is limited. In order to efficiently store event information within the trace buffer 208, it is necessary that the event information be recorded efficiently, such as through the use of codes for specified recorded events, and a limited number of fields within each entry. The present invention is implemented with this in mind by not requiring additional fields to be added for each recorded event. Furthermore, the present invention provides for an ability to record non-time monotonically increasing information with respect to each recorded event for providing trace records more specific to the programmer's particular needs. The present invention performs this in a programmable manner by providing for a more generalized "non-time timestamp" metric of interest. The metric of interest may be a monotonically increasing piece of data, such as the number of instructions executed. With such an example, recorded events can be compared as a function of the number of instructions executed between each recorded event.

Figure 3:
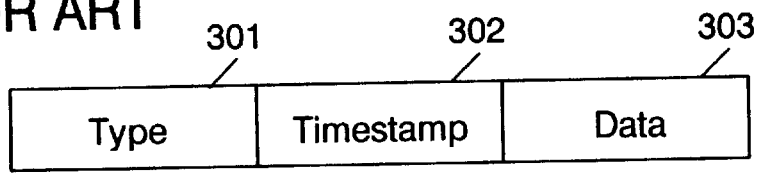
FIG. 3 illustrates a prior art entry within a typical trace buffer.
Figure 4:
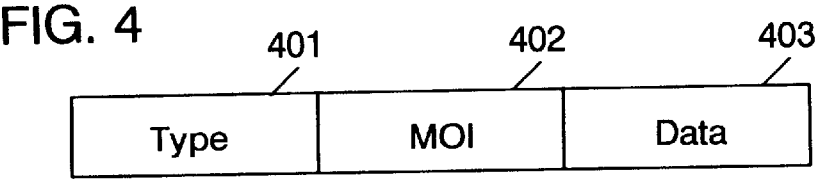
FIG. 4 illustrates an entry within a trace buffer in accordance with the present invention.

The present invention only slightly modifies the existing fields of recorded information for each entry within the trace buffer 208 (as illustrated in FIG. 3), by replacing the time specific timestamp 302 with the more generalized user selected metric of interest ("MOI") 402 to accompany the event type 401 and associated data 403, as illustrated in FIG. 4.

Figure 5:
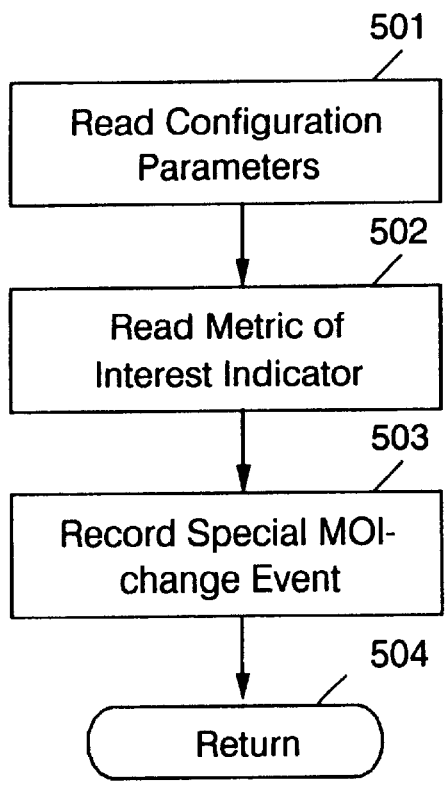
FIG. 5 illustrates a flow diagram for setting the MOI in accordance with the present invention.

Referring to FIG. 5, there is illustrated a process for programming (selecting) the metric of interest by the programmer (user) for a specified series of recorded events. The metric of interest may be time or non-time based. In step 501, the configuration parameters are read. In this step, the trace mechanism parameters are obtained, such as the buffer size, and where in memory the trace buffer 208 will be located. Additionally, the system trace program 207 is initialized along with the trace buffer 208. Next, in step 502, the user-specified metric of interest is obtained by reading the MOI indicator stored in ASCII within a facility, such as a register, by the user. As discussed below, the MOI indicator is looked up in a table and an index is identified. Then when the event is recorded, the appropriate function is called to obtain the MOI indicator.

As an example, a user may specify the MOI by using a keyword. For example,

START_TRACE 1000000 MOI=cycles might start the trace facility with a 1 megabyte buffer using cycles (time) as the MOI. Or, START_TRACE 1000000 MOI=L1_cache_misses might start the trace facility with a 1 megabyte buffer using L1 cache misses as the MOI. Another example, is that START_TRACE 1000000 MOI=JVM_byte_codes might start the trace facility with a 1 megabyte buffer using JVM byte codes executed as the MOI.

If none is specified, then a default, such as "cycles," may be used. Step 502 also performs the look up in a table of the specified MOI, which matches the specified code to a table entry. If found, the entry is saved as a global variable, e.g.,

```
if (MOI_string == "cycles") MOI_index = 0
else if (MOI_string == "L1_cache_misses") MOI_index = 1
else if (MOI_string == "JVM_byte_codes") MOI_index = 2
else (MOI_index = 0).
```

To facilitate postprocessing of the event stream, a special event is injected at this point (step 503). The event records the ID (number) of the MOI to be used for subsequent events. In other words, an event is recorded that has a Type field indicating a MOI-change event. The MOI field is whatever the current value of the current MOI indicator. The data field contains the new MOI_index. (From that point on (until the next request by the user to change the MOI), all subsequent events will be recorded with the MOI field being obtained based on the new value of MOI_index.)

Figure 6:
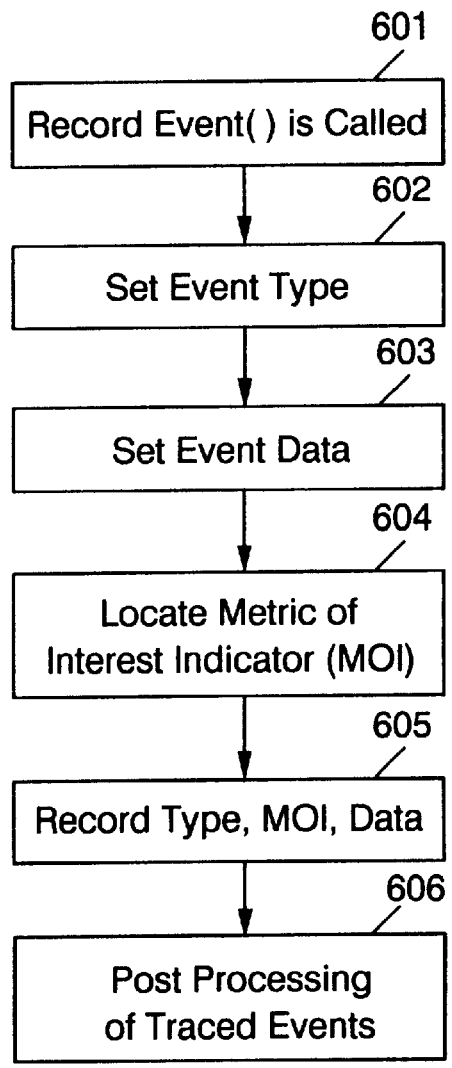
FIG. 6 illustrates recording of the event information, with the specified MOI, in accordance with the present invention.

Next, refer to FIG. 6 which illustrates a process for recording an event in accordance with the present invention. In step 601, when a specified event occurs, control is transferred to the Record Event ( ) function, which is called. In step 602, the event type is identified, and in step 603, the event data (if any) is obtained. In step 604, the MOI is used to index into a function table (a table of function pointers) and the resulting function is called. The function returns the value to be used in the event MOI field.

In order for this to occur, the MOI_index is then passed as a global variable to the event recording function (Record Event ( )) so that at each subsequent call to Record Event, the appropriate MOI is obtained. A table of function pointers is maintained in the Record Event ( ) function. This table is indexed by MOI_index. A sample table is shown below developed based on samples in a typical C++ programming language book. Function pointers and arrays of function pointers are fairly common practice in C and C++ programming:

```
typedef void (*PF) ();
PF MOI_functions[ ] = {
&getCycles,
&getL1CacheMisses,
&getJVMbytecodes
}
```

The correct function is called in the Record Event ( ) routine by simply invoking:

(*MOI_functions[MOI_index]) ( );

Note that only one function is called—the one that corresponds to the desired MOI_index.

Thereafter, in step 605, the event information is recorded within an entry in the trace buffer 208. Steps 601–605 may occur a multitude of times filling up the trace buffer 208. Afterwards, in step 606 the data in trace buffer 208 is postprocessed.

As noted above, the MOI may record any type of counter value that indicates progress. Some progress indicators are hardware counter based, such as the performance monitors often implemented within central processing units. Such performance monitors are discussed within U.S. patent application Ser. No. 08/767,655, which is hereby incorporated by reference herein.

Other candidate progress indicators may have a software nature (e.g., the cumulative number of bytes interpreted by a Java machine), and the function will read a global counter exported by that instrumented component.

The use of a function table is an implementation detail. Depending on the range of progress indicators to be made available in an implementation, it might be desirable to "inline" the mechanism (i.e. do not call a function—instead put a C switch statement in the body of the Record Event ( ) function). For example, suppose the Java machine exports global variables, JVM_BC_Executed and JVM_Objects_Allocated, and these are the two software progress indicators from which it is desired to select. An implementation may occur as follows:

```
{
extern long JVM_BC_Executed;
extern long JVM_Objects_Allocated;
...
switch (MOI) {
case '0': progress_indicator=get Cycles();
/* cause a function to get the machine cycles value */ break; case '1';
progress_indicator=JVB_BC_Executed;
/* gets total byte codes executed by JVM */ break;
case '2': progress_indicator=JVM_Objects_Allocated;
/* gets number of objects allocated */ break;
default: progress_indicator=get Cycles();
/* gets machine cycles */ break;
}
```

Therefore, instead of calling a function, in some cases, a global variable is referenced. The switch statement above is simply a programming mechanism that is more efficient than a long cascade of if-then-else statements.

The present invention analyzes the behavior/performance of the system/application/program from a user-selectable perspective, e.g., it might be advantageous to determine the number of machine instructions that executed between two application program interface calls. Such extensions typically require the modification of existing events (adding new fields), which have repercussions throughout the instrumentation, collection, and postprocessing pipeline. If a new field is added to an event, then the event postprocessor must be notified of the change; otherwise, it will not be able to correctly read the data in the event stream. Further, it should be noted that event analysis routines are usually already enabled for processing timestamps in events. That is, they expect the field to have certain properties, most important of which is that it be monotonically increasing (so that subsequent events are guaranteed to be recorded at a time no sooner than prior events). These postprocessors typically develop statistics based on the difference in time between one event and another; these differences are accumulated to obtain detailed delay profiles as disclosed within U.S. patent application Ser. No. 08/989,725 entitled "SYSTEM AND METHOD FOR PROVIDING TRACE INFORMATION DATA REDUCTION," now U.S. Pat. No. 6,055,492, which is hereby incorporated by reference herein. The present invention has an advantage of providing the user an opportunity to select the metric of interest, which may be time or non-time based.

Consider the following example in which an application's performance is analyzed from a perspective distinct from the traditional one of time (or delay) analysis. The performance of one Java Just-in-time compiler is evaluated in comparison to an alternative Java Just-in-time compiler. While time based analysis may appear compelling, there is a problem. For small methods, any timer based measurement will be very sensitive to issues of cache alignment, instruction and data cache misses, and the perturbation of the instrumentation code itself to the measurement. An alternative to timer based measurement in this case is to measure instructions executed. Such a measurement is not sensitive in the same way to those issues above. Instead, if a measurement of instructions executed from method entry to exit is taken, this measurement is affected only by the presence of the instrumentation code itself—and this impact is constant. So, it is possible to initiate such a measurement in which the MOI is "instructions," and for this measurement to reliably reveal low level information about the number of instructions generated by one Just-in-time compiler as compared to another.

Continuing with this example, the MOI is designated as "instructions". The resulting MOI_functions[] table entry will point to a function, &get Instructions, that will return the total number of machine level instructions that have been executed to that point. This is the value used as the MOI in each entry and exit event for this trace. The result is that subsequent events will have MOI fields reflecting the total number of instructions executed. Postprocessing will be able to readily discern the exact number of events that have occurred between method (or function) entry and method (or function) exit. There is overhead—but a simple null function invocation, e.g.,

```
call null()
where null is defined as:
null() {
return;
}
``` when similarly instrumented, will reveal the number of instructions involved in calling a "null function." This overhead can then be deleted from the profiles produced for each function.

Although the present invention and its advantages have been described in detail, it should be understood that various changes, substitutions and alterations can be made herein without departing from the spirit and scope of the invention as defined by the appended claims.

What is claimed is:

1. In a data processing system, a method comprising the steps of:
   collecting events from a monitored process over a span of time;
   stamping each of the events with a user-selectable metric of interest; and
   storing each of the events with its respective metric of interest.

2. The method as recited in claim 1, wherein the user-selectable metric of interest is monotonically increasing over a span of time.

3. The method as recited in claim 2, wherein the metric of interest is not a timestamp.

4. The method as recited in claim 2, wherein the events are trace events that are stored in a trace buffer with the stamped metric of interest.

5. The method as recited in claim 4, further comprising the step of postprocessing the trace events.

6. The method as recited in claim 4, wherein the metric of interest is selected from a group of time and non-time based metrics of interest.

7. A data processing system comprising:
   a processor coupled to a storage device, a memory device, an input device, and an output device via a bus system, wherein the processor is operable for running a specified process and an event recording program, the processor further comprising:
   circuitry for monitoring the process;
   circuitry for collecting events from the monitored process over a span of time;
   circuitry for stamping each of the events with a non-time, increasing metric of interest; and
   circuitry for storing each of the events with its respective metric of interest in the memory device.

8. The system as recited in claim 7, wherein the non-time, increasing metric of interest is monotonically increasing over the span of time.

9. The system as recited in claim 7, wherein the metric of interest is not a timestamp.

10. The system as recited in claim 7, wherein the events are trace events that are stored in a trace buffer with the stamped metric of interest.

11. The system as recited in claim 7, wherein the metric of interest is supplied by a counter implemented within the processor.

12. A computer program product adaptable for storage in a computer readable medium and operable for recording events occurring within a process operating in a data processing system, the computer program product comprising:
   programming operable for collecting events from a monitored process over a span of time;
   programming operable for stamping each of the events with a user-selectable metric of interest; and
   programming operable for storing each of the events with its respective metric of interest.

13. The computer program product as recited in claim 12, wherein the user-selectable metric of interest is monotonically increasing over the span of time.

14. The computer program product as recited in claim 13, wherein the metric of interest is not a timestamp.

15. The computer program product as recited in claim 13, wherein the events are trace events that are stored in a trace buffer with the stamped metric of interest.

16. The computer program product as recited in claim 13, wherein the metric of interest is supplied by a counter implemented within the data processing system.

17. The computer program product as recited in claim 13, further comprising:
   programming operable for initializing a trace program in the data processing system, including defining a trace buffer operable for storing the events; and
   programming operable for specifying the metric of interest.

18. The computer program as recited in claim 12, wherein the metric of interest may be selected from a group consisting of time and non-time based metrics of interest.

19. In a data processing system, a method for recording an event comprising the steps of:
   reading configuration parameters to determine the size and location of a trace buffer;
   initializing said trace buffer and a system trace program to trace user specified events;
   collecting said user specified events from said trace program;
   stamping said user specified events with a user specified metric of interest; and
   storing said user specified events with said user specified metric of interest.

20. The method as recited in claim 19, wherein said user specified metric of interest is not a timestamp.

21. The method as recited in claim 19, wherein said user specified metric of interest is monotonically increasing over a span of time.

22. A computer program product adaptable for storage in a computer readable medium and operable for recording events occurring within a process operating in a data processing system, the computer program product comprising:

programming operable for reading configuration parameters to determine the size and location of a trace buffer;

programming operable for initializing said trace buffer and a system trace program to trace user specified events;

programming operable for collecting said user specified events from said trace program;

programming operable for stamping said user specified events with a user specified metric of interest; and programming operable for storing said user specified events with said user specified metric of interest.

23. The computer program product as recited in claim 22, wherein said user specified metric of interest is not a timestamp.

24. The computer program product as recited in claim 22, wherein said user specified metric of interest is monotonically increasing over a span of time.

* * * * *